United States Patent
Sugizaki et al.

(10) Patent No.: US 6,668,121 B2
(45) Date of Patent: Dec. 23, 2003

(54) OPTICAL FIBER, AND DISPERSION COMPENSATOR USING SAME, OPTICAL TRANSMISSION LINE USING SAME AND OPTICAL TRANSMISSION SYSTEM USING SAME

(75) Inventors: Ryuichi Sugizaki, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 83 days.

(21) Appl. No.: 09/956,829

(22) Filed: Sep. 21, 2001

(65) Prior Publication Data

US 2002/0122646 A1 Sep. 5, 2002

(30) Foreign Application Priority Data

Sep. 21, 2000 (JP) ........................................ 2000-287471
Jul. 25, 2001 (JP) ........................................ 2001-224606

(51) Int. Cl.[7] .................................................. G02B 6/02
(52) U.S. Cl. ........................ 385/127; 385/123; 385/124
(58) Field of Search ................................ 385/122, 123, 385/124, 125, 126, 127, 128

(56) References Cited

U.S. PATENT DOCUMENTS 6,009,221 A    12/1999   Tsuda
6,445,864 B2 * 9/2002   Jiang et al. .................. 385/127
6,510,268 B1 * 1/2003   de Montmorillon et al. ..... 385/123

FOREIGN PATENT DOCUMENTS

JP    2001-242336    9/2001

* cited by examiner

*Primary Examiner*—Robert H. Kim
*Assistant Examiner*—Michael H Caley
(74) *Attorney, Agent, or Firm*—Oblon, Spivak, McClelland, Maier & Neustadt, P.C.

(57) ABSTRACT

There is provided an optical fiber for flattening a dispersion slope in a transmission wavelength band and suitable for high bit-rate and high capacity WDM transmission in a wide range. In this optical fiber, conditions of $0.8\% \leq \Delta1 \leq 3.0\%$, $-0.7\% \leq \Delta2 \leq -0.4\%$, and $0.2\% \leq \Delta3 \leq 0.5\%$ are satisfied when a relative refractive index difference of the first core with respect to the clad is set to $\Delta1$, a relative refractive index difference of the second core with respect to the clad is set to $\Delta2$, and a relative refractive index difference of the third core with respect to the clad is set to $\Delta3$. A cable cutoff wavelength lies on a short wavelength side from 1520 nm. Further, relations of $S<0$ and $0<(D/S)\leq200$ are satisfied in a specific set wavelength band having a range width of not less than 20 nm within a wavelength band of 1.5 $\mu$m when a chromatic dispersion at a specific wavelength within the wavelength band of 1.5 $\mu$m is set to D (ps/nm/km) and a dispersion slope is set to S (ps/nm$^2$/km).

7 Claims, 2 Drawing Sheets

21  22  23  24  25

31  32  33  34  35

OPTICAL FIBER, AND DISPERSION COMPENSATOR USING SAME, OPTICAL TRANSMISSION LINE USING SAME AND OPTICAL TRANSMISSION SYSTEM USING SAME

FIELD OF THE INVENTION

The present invention relates to an optical fiber and a dispersion compensator, an optical transmission line and an optical transmission system all of which use this optical fiber and which are applied to e.g., a wavelength division multiplexing (WDM) transmission as one use.

BACKGROUND OF THE INVENTION

The WDM transmission is a communication system for transmitting signals of plural wavelengths by one optical fiber. In recent years, an erbium doped fiber amplifier (EDFA) using an erbium doped optical fiber is used as an amplifier of an optical signal. This EDFA can directly amplify the optical signal of each wavelength in a wavelength band of 1.5 μm without converting the optical signal to an electric signal in a repeater using the WDM transmission. Therefore, the WDM of optical communication is accelerated by an appearance of the EDFA.

It is well known that a chromatic dispersion and non-linearity obstruct high bit-rate transmission of the optical signal. If the fibers have large chromatic dispersion value, waveform distortion is occurred and no high bit-rate transmission can be performed. On the other hand, when the chromatic dispersion approaches zero, four-wave mixing (FWM) as one of non-linear phenomena is generated and signal distortion is caused so that it is difficult to perform the WDM transmission.

To avoid such a phenomenon, an optical fiber for reducing the non-linearity itself and providing a very small dispersion in a transmission range of the optical signal is proposed in Japanese Patent Laid-Open No. 168046/1995, etc.

SUMMARY OF THE INVENTION

The present invention provides an optical fiber suitable for the WDM transmission as one use example, and a dispersion compensator, an optical transmission line and an optical transmission system all of which use this optical fiber. This optical fiber comprises a refractive index profile structure constructed by at least three core layers and a clad outside these core layers;

wherein the three core layers are arranged in an order of first, second and third layers from the inside to the outside;

conditions of $0.8\% \leq \Delta1 \leq 3.0\%$, $-0.7\% \leq \Delta2 \leq -0.4\%$, and $0.2\% \leq \Delta3 \leq 0.5\%$ are satisfied when a relative refractive index difference of the first core with respect to the clad is set to $\Delta1$, a relative refractive index difference of the second core with respect to the clad is set to $\Delta2$, and a relative refractive index difference of the third core with respect to the clad is set to $\Delta3$;

a cable cutoff wavelength lies on a short wavelength side from 1520 nm; and the relations of $D<0$, $S<0$, and $0<(D/S) \leq 200$ are satisfied in a specific set wavelength band having a range width of not smaller than 20 nm within a wavelength band of 1.5 μm when a chromatic dispersion at a specific wavelength within a wavelength band of 1.5 μm is set to D (ps/nm/km) and a dispersion slope is set to S (ps/nm²/km).

BRIEF DESCRIPTION OF THE DRAWINGS

Exemplary embodiments of the invention will now be described in conjunction with drawings in which.

DETAILED DESCRIPTION

Figure 1:
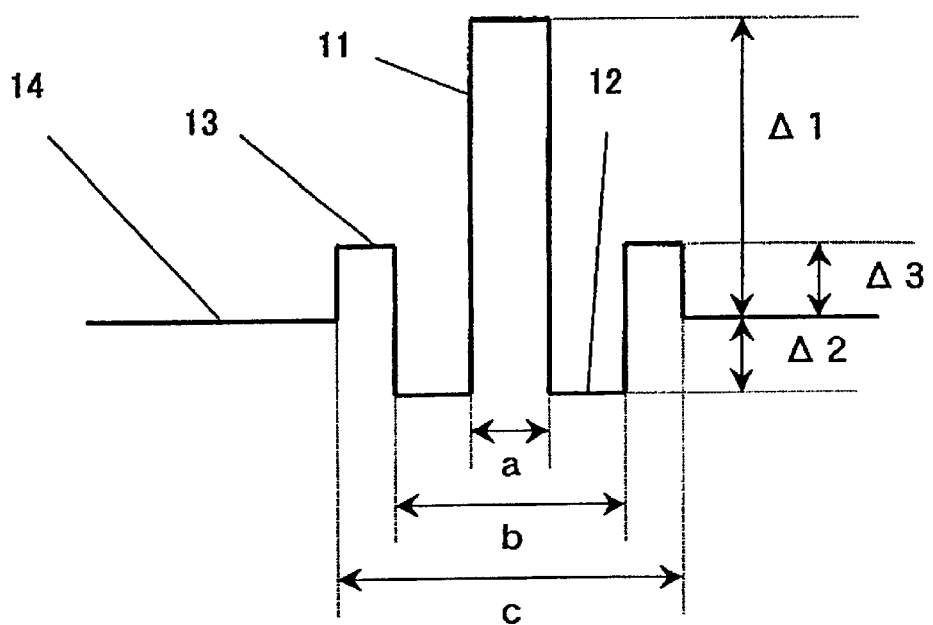
FIG. 1 is a view showing a refractive index profile structure of an optical fiber in one embodiment of the invention.

An optical fiber for WDM transmission for reducing non-linearity and providing a small dispersion in a transmission range of an optical signal is proposed as mentioned above. It seemed that the problems of the dispersion and the non-linearity were solved by using the proposed optical fiber of this kind. However, when it is intended that the number of optical signals of the WDM transmission is increased by a request of high capacity transmission, it is necessary to maintain a small dispersion at an entire wavelength interval of a wide range.

However, no optical fiber for the WDM transmission conventionally proposed is developed on the supposition of such high capacity transmission having very many signals. Accordingly, no very small dispersion can be maintained in the wide range. Therefore, it is difficult to achieve high bit-rate and high capacity transmission of high quality by using the conventional optical fiber for the WDM transmission.

There is also a possibility that an optical fiber having a very small dispersion close to zero over the entire transmission range and having an approximately zero dispersion slope is obtained. However, in the optical fiber having the small dispersion and the small dispersion slope over the wide range, four-wave mixing is generally generated and non-linearity is bad, and distortion of the optical signal is generated when this optical fiber is connected just after an optical amplifier.

According to one aspect of this invention, the present invention provides an optical fiber for compensating the dispersion slope of an optical transmission line constructed by an optical fiber providing a small dispersion in the transmission range of an optical signal, and enabling wide range WDM transmission. Further, the invention also provides a dispersion compensator, an optical transmission line and an optical transmission system all of which use this optical fiber.

In the optical fiber of the invention, a cable cutoff wavelength lies on a short wavelength side from a wavelength of 1520 nm as a lower limit of a using wavelength area (here a wavelength band of 1.5 μm). Accordingly, a single mode operation is performed in the entire using wavelength area. Therefore, it is possible to obtain stable transmission characteristics having no influence of a disturbance.

A dispersion value of the optical fiber used in the existing WDM transmission line approximately ranges from 2 to 6 ps/nm/km, and an average dispersion slope is about +0.07 ps/nm²/km. An optical transmission line for compensating the very small dispersion and reducing the dispersion slope and having flat dispersion characteristics in a wide range of wavelength is realized by connecting the optical fiber of one constructional example of the invention having a negative chromatic dispersion and a negative dispersion slope, to this WDM transmission line having a positive very small dispersion and a positive dispersion slope. Thus, a usable wavelength range is widened and the WDM transmission can be performed in a wide range of wavelength. Since the dispersion of the WDM transmission line is not zero but is of a very small value to such an extent that no four-wave mixing is caused, a non-linear phenomenon is also restrained.

In this specification, a wavelength band of 1.5 μm shows a wavelength range from 1520 to 1620 nm unless otherwise specified hereinafter. A specific wavelength in a 1.5 μm wavelength band shows a concrete wavelength within the wavelength band of 1.5 μm such as 1550 nm in wavelength. Further, a specific set wavelength band of the wavelength band of 1.5 μm is an optical transmission wavelength band set within the above wavelength range from 1520 to 1620 nm, and concretely shows a wavelength band at a partial interval within the wavelength band of 1.5 μm such as a wavelength from 1530 to 1570 nm, etc.

FIG. 1 shows a refractive index profile structure of an optical fiber in one embodiment of the invention. In FIG. 1, a core is constructed by a three-layer structure. The refractive index profile structure shown in FIG. 1 is constructed by sequentially arranging a first core 11, a second core 12, a third core 13, and a clad 14 from the inside to the outside. The first core 11 has a maximum refractive index. The first core 11 has a relative refractive index difference Δ1 with respect to the clad 14. The second core 12 has a relative refractive index difference Δ2 with respect to the clad 14. The third core 13 has a relative refractive index difference Δ3 with respect to the clad 14.

Figure 2:
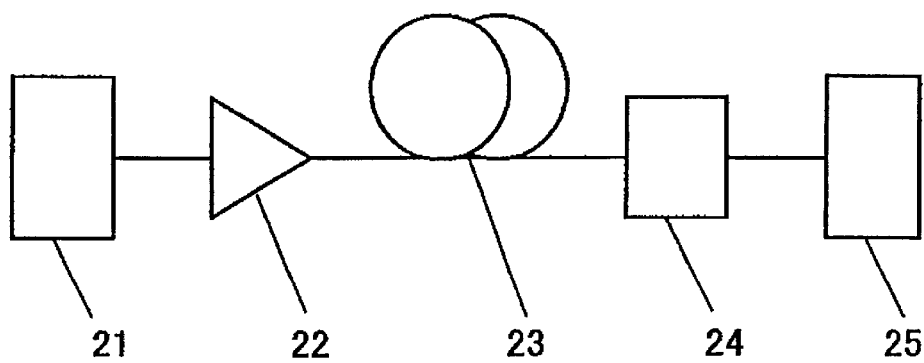
FIG. 2 is an explanatory view showing one example in which a dispersion compensator of one embodiment of the invention is applied to an optical transmission system.

FIG. 2 is an explanatory view showing one example of the case in which a dispersion compensator 24 of one embodiment of the invention is applied to an optical transmission system. In FIG. 2, reference numerals 21, 22, 23, and 25 respectively designate an optical transmitter, an optical amplifier, an existing optical transmission line (WDM transmission line) using an optical fiber for the WDM transmission, and an optical receiver. In the dispersion compensator 24, the optical fiber of the invention functions as a fiber for compensating the dispersion and the dispersion slope. The external appearance construction of a system of FIG. 2 itself is equal to that of the conventional optical transmission system, but the system of FIG. 2 differs from the conventional system in that the optical fiber of the invention is used in the dispersion compensator 24. Dispersion characteristics are greatly improved by using the optical fiber of the invention in the dispersion compensator 24.

Figure 3:
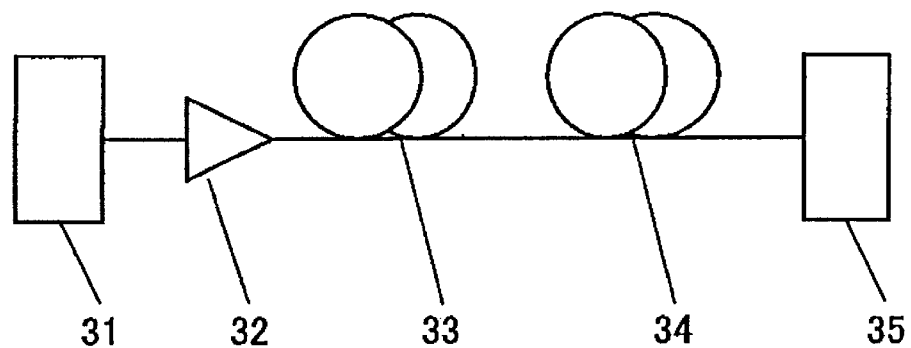
FIG. 3 is an explanatory view showing one example of the optical transmission system into which an optical transmission line of one embodiment of the invention is incorporated.

FIG. 3 shows an optical transmission system constructed by assembling an optical transmission line of one embodiment of the invention. In FIG. 3, reference numerals 31, 32, 33, 34, and 35 respectively designate an optical transmitter, an optical amplifier, a first optical transmission line (here a WDM transmission line) using an existing optical fiber for WDM transmission, a second optical transmission line using the optical fiber of the invention, and an optical receiver.

An external appearance construction of the system of FIG. 3 itself is equal to that of the conventional system, but the system of FIG. 3 differs from the conventional system in that the optical fiber of the invention is used in the second optical transmission line 34. Dispersion characteristics are greatly improved by using the optical fiber of the invention in the second optical transmission line 34 in comparison with the optical transmission system of the conventional example.

One embodiment of the optical fiber of the invention will next be explained more specifically.

The optical fiber of one embodiment of the invention has the refractive index profile structure shown in FIG. 1. Optical fibers having this refractive index profile structure are fabricated as samples by changing various kinds of parameters. Table 1 shows the parameters of a refractive index profile of each fabricated optical fiber and characteristics at a wavelength of 1550 nm.

TABLE 1

| No. | Δ1 (%) | Δ2 (%) | Δ3 (%) | a/b | c/b | CORE DIAMETER (μm) | DISPERSION (ps/nm/km) | DISPERSION SLOPE (ps/nm²/km) | DPS (nm) | CUTOFF WAVELENGTH (nm) | CABLE CUTOFF WAVELENGTH (nm) |
|---|---|---|---|---|---|---|---|---|---|---|---|
| 1 | 0.7 | −0.7 | 0.3 | 0.6 | 1.4 | 7.25 | 7.70 | 0.006 | **** | 952 | 903 |
| 2 | 0.8 | −0.7 | 0.3 | 0.6 | 1.4 | 6.50 | −0.99 | −0.025 | 40 | 856 | 808 |
| 3 | 1.3 | −0.7 | 0.2 | 0.3 | 1.2 | 4.63 | −1.15 | −0.008 | 144 | 893 | 811 |
| 4 | 1.4 | −0.7 | 0.2 | 0.3 | 1.2 | 3.64 | −5.85 | 0.021 | **** | 846 | 781 |
| 5 | 1.3 | −0.8 | 0.5 | 0.6 | 1.4 | 5.00 | −32.00 | −0.221 | 145 | 1750 | 1713 |
| 6 | 1.3 | −0.7 | 0.5 | 0.6 | 1.4 | 4.64 | −33.10 | −0.174 | 190 | 1520 | 1482 |
| 7 | 0.8 | −0.3 | 0.5 | 0.3 | 1.2 | 5.60 | −12.73 | −0.362 | 35 | 1620 | 1579 |
| 8 | 0.8 | −0.4 | 0.5 | 0.3 | 1.4 | 5.60 | −10.68 | −0.633 | 17 | 1510 | 1480 |
| 9 | 0.8 | −0.7 | 0.1 | 0.6 | 1.4 | 7.06 | 4.96 | −0.002 | **** | 930 | 860 |
| 10 | 0.8 | −0.7 | 0.2 | 0.6 | 1.2 | 6.85 | −5.75 | −0.057 | 101 | 1427 | 1381 |
| 11 | 1.3 | −0.7 | 0.5 | 0.3 | 1.2 | 4.66 | −17.02 | −0.145 | 117 | 1408 | 1368 |
| 12 | 1.3 | −0.7 | 0.6 | 0.3 | 1.2 | 4.66 | −21.91 | −0.300 | 73 | 1583 | 1541 |
| 13 | 1.3 | −0.7 | 0.2 | 0.2 | 1.2 | 4.63 | 2.53 | 0.032 | **** | 885 | 800 |
| 14 | 1.3 | −0.7 | 0.2 | 0.3 | 1.2 | 4.63 | −1.15 | −0.008 | 144 | 893 | 804 |
| 15 | 0.8 | −0.7 | 0.3 | 0.6 | 1.4 | 6.50 | −0.99 | −0.025 | 40 | 856 | 801 |
| 16 | 0.8 | −0.7 | 0.3 | 0.7 | 1.4 | 7.52 | 3.21 | 0.012 | **** | 920 | 872 |
| 17 | 0.8 | −0.4 | 0.5 | 0.3 | 1.1 | 6.22 | −2.23 | 0.025 | **** | 1490 | 1453 |
| 18 | 0.8 | −0.4 | 0.5 | 0.3 | 1.2 | 5.60 | −10.68 | −0.633 | 17 | 1510 | 1472 |
| 19 | 1.3 | −0.7 | 0.5 | 0.6 | 1.4 | 4.64 | −33.10 | −0.174 | 190 | 1520 | 1480 |
| 20 | 1.3 | −0.7 | 0.5 | 0.6 | 1.5 | 4.52 | −40.30 | −0.202 | 200 | 1590 | 1547 |
| 21 | 1.1 | −0.6 | 0.3 | 0.4 | 1.3 | 4.99 | −14.47 | −0.716 | 20 | 1520 | 1452 |
| 22 | 3.0 | −0.6 | 0.2 | 0.4 | 2.0 | 2.63 | −192.48 | −0.986 | 195 | 1511 | 1430 |
| 23 | 3.1 | −0.6 | 0.2 | 0.4 | 2.0 | 2.55 | −209.00 | −0.984 | 212 | 1470 | 1401 |
| 24 | 3.0 | −0.6 | 0.2 | 0.4 | 2.1 | 2.63 | −208.41 | −1.150 | 181 | 1636 | 1543 |

In this table, No. shows a number of the fabricated fiber and the core diameter shows an outside diameter a of the first core 11. DPS shows a value obtained by dividing a dispersion by a dispersion slope. The value of DPS is an index showing the height of a dispersion compensating rate with respect to a positive dispersion optical fiber, and aims at a positive value not more than 200 in this embodiment. In the table 1, a column having no numeric value of the DPS shows that there is no meaning of a calculation of the numeric value since both the dispersion and the dispersion slope are not negative.

As shown by the fabricated optical fiber No. 23, when $\Delta 1$ is not less than 3.1%, the value of DPS can not be set to not less than 200 in a negative dispersion area. Further, as shown in the fabricated optical fiber No. 1, when $\Delta 1$ is not larger than 0.7%, it should be understood that the optical fiber has no propagation solution in the negative dispersion slope. Therefore, it is said that it is suitable to set $\Delta 1$ to not less than 0.8% and not more than 3.0%.

As shown by the fabricated optical fiber No. 5, the optical fiber has no propagation solution unless the cutoff wavelength is set on a long wavelength side from 1.5 $\mu$m when $\Delta 2$ is too low. When $\Delta 2$ is $-0.8\%$, the cutoff wavelength is set on the long wavelength side from 1520 nm. In contrast to this, when $\Delta 2$ is not less than $-0.7\%$, the cutoff wavelength can be set on a short wavelength side from 1520 nm by setting a condition. When $\Delta 2$ is too high as in the fabricated optical fiber No. 7, no optical fiber having both a negative dispersion and a negative dispersion slope is obtained under a condition in which the cutoff wavelength is not more than 1520 nm. The fabricated optical fiber No. 7 has no propagation solution having the negative dispersion unless the cable cutoff wavelength is 1579 nm. However, when $\Delta 2=-0.4\%$ is set as in the fabricated optical fiber No. 8, this optical fiber has the propagation solution on a short wavelength side of the cutoff wavelength from 1520 nm. Accordingly, it is said that it is suitable to set $\Delta 2$ to not less than $-0.7\%$ and not more than $-0.4\%$.

When $\Delta 3$ is too small as in the fabricated optical fiber No. 9, no arranging effect of the third core 13 is fulfilled. In contrast to this, when $\Delta 3$ is too high as in the fabricated optical fiber No. 12, the cable cutoff wavelength is set on a long wavelength side from 1520 nm. Accordingly, it is said that it is suitable to set $\Delta 3$ to not less than 0.2% and not more than 0.5%.

When an outside diameter of the first core is set to a, an outside diameter of the second core is set to b, and an outside diameter of the third core is set to c, and the ratio a/b is small as in the fabricated optical fiber No. 12, the dispersion slope becomes steep, but the optical fiber has no propagation solution. It is sufficient to increase the core diameter to have the propagation solution by reducing the ratio a/b, but no negative dispersion is obtained in this case.

When the ratio a/b is 0.7 as in the fabricated optical fiber No. 16, no negative dispersion slope is obtained. Therefore, it can be said that it is suitable to set the ratio a/b to 0.3 or more and 0.6 or less.

When the ratio c/b is not more than 1.1 as in the fabricated optical fiber No. 17, no propagation solution is obtained in the negative dispersion slope. When the ratio c/b is not less than 2.1 as in the fabricated optical fiber No. 24, the cutoff wavelength lies on a long wavelength side from 1520 nm so that no single mode operation is performed. Therefore, it can be said that it is suitable to set the ratio c/b to the range from 1.2 to 2.0.

There is no propagation solution when no outside diameter a of the first core 11 is not less than 2.5 $\mu$m. However, when this core outside diameter exceeds 7 $\mu$m, there is no combination in which both the dispersion and the dispersion slope satisfy a negative condition and the cutoff wavelength is smaller than 1520 nm. Accordingly, it has been found that it is suitable to set the outside diameter a of the first core to not less than 2.5 $\mu$m and not more than 7 $\mu$m.

Table 2 shows dispersion characteristics when the outside diameters of the first core of the optical fiber No. 21 of the table 1 among the fabricated optical fibers ($\Delta 1=1.1\%$, $\Delta 2=-0.6\%$, $\Delta 3=0.3\%$, a/b=0.4, c/b=1.3) were changed.

TABLE 2

| | A Core diameter 5.23 um | | | B Core diameter 4.97 um | | |
|---|---|---|---|---|---|---|
| Wavelength [nm] | Dispersion value (ps/nm/km) | Slope (ps/nm²/km) | DPS (nm) | Dispersion value (ps/nm/km) | Slope (ps/nm²/km) | DPS (nm) |
| 1520 | −3.29 | 0.0202 | *** | −15.99 | −0.3873 | 41 |
| 1525 | −3.41 | 0.0194 | *** | −16.76 | −0.4490 | 37 |
| 1530 | −3.54 | 0.0182 | *** | −17.59 | −0.5121 | 34 |
| 1535 | −3.70 | 0.0163 | *** | −18.50 | −0.5755 | 32 |
| 1540 | −3.88 | 0.0135 | *** | −19.50 | −0.6384 | 31 |
| 1545 | −4.09 | 0.0095 | *** | −20.58 | −0.6997 | 29 |
| 1550 | −4.32 | 0.0039 | *** | −21.76 | −0.7587 | 29 |
| 1555 | −4.58 | −0.0036 | 1282 | −23.05 | −0.8144 | 28 |
| 1560 | −4.86 | −0.0134 | 362 | −24.45 | −0.8661 | 28 |
| 1565 | −5.18 | −0.0260 | 199 | −25.99 | −0.9133 | 28 |
| 1570 | −5.52 | −0.0417 | 133 | **** | **** | **** |
| 1575 | −5.90 | −0.0608 | 97 | **** | **** | **** |
| 1580 | −6.32 | −0.0836 | 76 | **** | **** | **** |
| 1585 | −6.77 | −0.1104 | 61 | **** | **** | **** |
| 1590 | −7.26 | −0.1411 | 51 | **** | **** | **** |
| 1595 | −7.80 | −0.1758 | 44 | **** | **** | **** |
| 1600 | −8.39 | −0.2143 | 39 | **** | **** | **** |
| 1605 | −9.03 | −0.2564 | 35 | **** | **** | **** |
| 1610 | −9.72 | −0.3018 | 32 | **** | **** | **** |
| 1615 | −10.46 | −0.3499 | 30 | **** | **** | **** |
| 1620 | −20.06 | −0.1137 | 176 | **** | **** | **** |

It can be seen that it is possible to satisfy the condition in which the dispersion value is a negative value of −26 ps/nm/km or more and the dispersion slope is a negative value and the DPS is a positive value of 200 nm or less in a specific set wavelength band having a range of 20 nm or more by changing the core diameter a in the refractive index profile structure shown in FIG. 1.

Concretely, it can be seen that the above relation is satisfied at a wavelength from 1565 to 1620 nm in the optical fiber A in Table 2, and a wavelength from 1520 to 1565 nm in the optical fiber B.

A dispersion compensator was next manufactured by using the above fabricated optical fiber to compensate the dispersion slope of the existing optical fiber for the WDM transmission of 60 km. Here, the optical fiber A in Table 2 was used, and an optical transmission system is constructed as shown in FIG. 2. In the optical fiber for the WDM transmission, the dispersion value is set to +4 ps/nm/km at a wavelength of 1550 nm, and the dispersion slope at this wavelength is set to 0.075 ps/nm²/km.

Table 3 shows the dispersion characteristics of an optical transmission line after the connection of a dispersion compensating module obtained by the construction of FIG. 2.

TABLE 3

| Wavelength (nm) | Dispersion of transmission line (ps/nm/km) | Dispersion after compensation (ps/nm/km) | Dispersion slope after compensation (ps/nm²/km) |
|---|---|---|---|
| 1520 | 1.96 | −0.83 | 0.091 |
| 1525 | 2.30 | −0.66 | 0.033 |
| 1530 | 2.64 | −0.50 | 0.030 |
| 1535 | 2.98 | −0.36 | 0.027 |
| 1540 | 3.32 | −0.23 | 0.024 |
| 1545 | 3.66 | −0.12 | 0.021 |
| 1550 | 4.00 | −0.02 | 0.017 |
| 1555 | 4.34 | 0.05 | 0.013 |
| 1560 | 4.68 | 0.11 | 0.009 |
| 1565 | 5.02 | 0.14 | 0.005 |
| 1570 | 5.36 | 0.16 | 0.000 |
| 1575 | 5.70 | 0.14 | −0.005 |
| 1580 | 6.04 | 0.11 | −0.010 |
| 1585 | 6.38 | 0.05 | −0.015 |
| 1590 | 6.72 | −0.05 | −0.021 |
| 1595 | 7.06 | −0.17 | −0.028 |
| 1600 | 7.40 | −0.32 | −0.035 |
| 1605 | 7.74 | −0.51 | −0.042 |
| 1610 | 8.08 | −0.74 | −0.050 |
| 1615 | 8.42 | −1.01 | −0.058 |
| 1620 | 8.76 | −1.32 | −0.029 |

It can be seen from Table 3 that the dispersion slope of each wavelength lies within ±0.03 ps/nm²/km in a set wavelength band having a range width of 65 nm, i.e., at a wavelength from 1530 to 1595 nm. Further, it can be seen that the dispersion slope of each wavelength lies within ±0.01 ps/nm²/km in a range of 20 nm within the above set wavelength band, i.e., at a wavelength from 1560 to 1580 nm.

Therefore, in the optical fiber of one embodiment of the invention, the dispersion slope of each wavelength of the optical transmission system (entire optical transmission line) can lie within ±0.03 ps/nm²/km in the set wavelength band within a wavelength band of 1.5 μm having a range width of 40 nm in a combining state with the existing optical transmission line. Further, the dispersion slope can lie within ±0.01 ps/nm²/km in the range of 20 nm within the above set wavelength band.

Namely, in FIG. 2, the flatness of the dispersion slope is achieved as shown in Table 3 by applying the optical fiber of the invention to the dispersion compensator 24. The flatness of the dispersion slope of the optical transmission line using the optical fiber of one example of the invention is optimal as the optical transmission line. Thus, a line path and an optical transmission system suitable for high bit-rate and high capacity transmission can be easily manufactured by applying the optical fiber of the above embodiment of the invention as an optical fiber for dispersion compensation of the dispersion compensator 24.

In the dispersion compensator 24 shown in FIG. 2, the optical fiber of the above one embodiment of the invention is wound around a bobbin, etc. This optical fiber of this dispersion compensator 24 is connected in series to the optical fiber of the optical transmission line 23, and is used.

FIG. 3 shows an example in which the optical fiber of the above one embodiment of the invention is used as one portion of the optical transmission line. In this optical transmission system of FIG. 3, the optical fiber of the above one embodiment of the invention is assembled as a second optical transmission line 34. Thus, effects similar to those in the case of the system of FIG. 2 are also obtained when the optical fiber of one embodiment of the invention is assembled as the optical transmission line. Namely, similar to the optical transmission system shown in FIG. 2, the optical transmission system shown in FIG. 3 can be set to an optical transmission system achieving the flatness of the dispersion slope and suitable for high bit-rate and high capacity transmission. The optical fiber in the invention becomes an optical fiber of the optical transmission line when the optical fiber of one embodiment of the invention is assembled into an optical fiber cable of the optical transmission line of the entire system as the optical transmission line 34. Therefore, the optical fiber in the invention is wound around a bobbin at a relatively long length and is constructed as the dispersion compensator 24. The actual light transmitting distance is shortened in the optical transmission system of FIG. 3 in comparison with the case of the optical transmission system of FIG. 2, in which the optical fiber of this dispersion compensator 24 is connected to the optical fiber of the optical transmission line and is used. If the transmitting distance is shortened, the transmission loss is correspondingly reduced and the dispersion slope in a transmitting range is also reduced. Therefore, in the optical transmission system of FIG. 3, the transmission loss is more easily reduced and the dispersion slope is more easily flattened in comparison with the optical transmission system of FIG. 2. Therefore, it is effective when the optical transmission system is arranged at a long distance.

The application scope of the invention is not limited to the scope of the above embodiment. For example, the core may be constructed by four layers or more, and the clad may be set to two layers or more. Further, with respect to the optical transmission system to which the optical fiber of the invention is applied, there are also various optical transmission systems in addition to the optical transmission systems shown in FIGS. 2 and 3. The optical fiber of the invention can be applied to these various optical transmission systems.

What is important in the invention is that the relations of D<0, S<0, and 0<(D/S)≦200 are satisfied in a specific set wavelength band having a range width of 20 nm or more in a wavelength band of 1.5 μm when the chromatic dispersion at a specific wavelength in the wavelength band of 1.5 μm is set to D (ps/nm/km) and the dispersion slope is set to S (ps/nm²/km), that the cutoff wavelength lies on a short wavelength side from 1520 nm. An optical fiber suitable for wide range WDM transmission is realized by satisfying such conditions, and that a dispersion compensator, an optical transmission line, and an optical transmission system all of which use this optical fiber are realized.

The optical fiber of the invention and the optical transmission line using this optical fiber compensate both a positive chromatic dispersion and a positive dispersion slope of the optical transmission line (a WDM transmission line as one example) having e.g., a very small dispersion in a transmission range of an optical signal, and particularly flatten the dispersion slope in a transmission wavelength band and enable the WDM transmission in a wide range.

What is claimed is:

1. An optical fiber comprising a refractive index profile structure constructed by at least three core layers and a clad outside these core layers;

wherein said three core layers are arranged in an order of first, second and third layers from an inside to an outside;

conditions of $0.8\% \leq \Delta 1 \leq 3.0\%$, $-0.7\% \leq \Delta 2 \leq -0.4\%$, and $0.2\% \leq \Delta 3 \leq 0.5\%$ are satisfied when a relative refractive index difference of the first core with respect to said clad is set to $\Delta 1$, a relative refractive index difference of the second core with respect to said clad is set to $\Delta 2$, and a relative refractive index difference of the third core with respect to said clad is set to $\Delta 3$;

a cable cutoff wavelength is equal to or less than 1520 nm;

relations of $D<0$, $S<0$, and $0<(D/S) \leq 200$ are satisfied in a specific set wavelength band having a range width of 20 nm or more within a wavelength band of 1.5 $\mu$m when a chromatic dispersion at a specific wavelength within the wavelength band of 1.5 $\mu$m is set to D (ps/nm/km) and a dispersion slope is set to S (ps/nm$^2$/km); and conditions of $2.5 \leq a \leq 7$, $0.3 \leq (a/b) \leq 0.6$, and $1.2 \leq (c/b) \leq 2.0$ are satisfied when an outside diameter of the first core is set to a ($\mu$m), an outside diameter of the second core is set to b ($\mu$m) and an outside diameter of the third core is set to c ($\mu$m).

2. A dispersion compensator constructed by using an optical fiber according to claim 1;

wherein the dispersion compensator is connected to an optical transmission line having a positive dispersion and a positive dispersion slope, and the dispersion slope (unit: ps/nm$^2$/km) of said optical transmission line is compensated within a range of not less than −0.01 and not more than 0.01 in the specific set wavelength band having the range width of not less than 20 nm within the wavelength band of 1.5 $\mu$m.

3. A dispersion compensator constructed by using an optical fiber according to claim 1;

wherein the dispersion compensator is connected to an optical transmission line having a positive dispersion and a positive dispersion slope, and the dispersion slope (unit: ps/nm$^2$/km) of said o not less than ptical transmission line is compensated within a range of not less than −0.03 and not more than 0.03 in the specific set wavelength band having the range width of not less than 40 nm within the wavelength band of 1.5 $\mu$m.

4. An optical transmission line constructed by using an optical fiber according to claim 1;

wherein the optical transmission line is connected to another optical transmission line having a positive dispersion and a positive dispersion slope, and the dispersion slope (unit: ps/nm$^2$/km) of said another optical transmission line having the positive dispersion and the positive dispersion slope is compensated within a range of not less than −0.01 and not more than 0.01 in the specific set wavelength band having the range width of not less than 20 nm within the wavelength band of 1.5 $\mu$m.

5. An optical transmission line constructed by using an optical fiber according to claim 1;

wherein the optical transmission line is connected to another optical transmission line having a positive dispersion and a positive dispersion slope, and the dispersion slope (unit: ps/nm$^2$/km) of said another optical transmission line having the positive dispersion and the positive dispersion slope is compensated within a range of not less than −0.03 and not more than 0.03 in the specific set wavelength band having the range width of not less than 40 nm within the wavelength band of 1.5 $\mu$m.

6. An optical transmission system constructed by using an optical fiber according to claim 1;

wherein the dispersion slope (unit: ps/nm$^2$/km) of the optical transmission system is adjusted to a range of not less than −0.01 and not more than 0.01 in the specific set wavelength band having the range width of not less than 20 nm within the wavelength band of 1.5 $\mu$m.

7. An optical transmission system constructed by using an optical fiber according to claim 1;

wherein the dispersion slope (unit: ps/nm$^2$/km) of the optical transmission system is adjusted to a range of not less than −0.03 and not more than 0.03 in the specific set wavelength band having the range width of not less than 40 nm within the wavelength band of 1.5 $\mu$m.

* * * * *